United States Patent
Nishimura et al.

(10) Patent No.: US 9,632,290 B2
(45) Date of Patent: Apr. 25, 2017

(54) WIDE-ANGLE LENS SYSTEM AND IMAGING APPARATUS

(71) Applicant: Panasonic Intellectual Property Management Co., Ltd., Osaka (JP)

(72) Inventors: Naoto Nishimura, Osaka (JP); Isamu Izuhara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/849,429

(22) Filed: Sep. 9, 2015

(65) Prior Publication Data

US 2016/0077314 A1  Mar. 17, 2016

(30) Foreign Application Priority Data

Sep. 16, 2014 (JP) ................................ 2014-187371
Jul. 29, 2015 (JP) ................................ 2015-149107

(51) Int. Cl.
*G02B 3/02* (2006.01)
*G02B 13/06* (2006.01)

(52) U.S. Cl.
CPC .................................. *G02B 13/06* (2013.01)

(58) Field of Classification Search
CPC ..................................................... G02B 13/04
USPC ......................................................... 359/708
See application file for complete search history.

(56) References Cited

U.S. PATENT DOCUMENTS

| 2005/0078380 A1* | 4/2005 | Tomioka | G02B 15/177 359/680 |
| 2010/0188757 A1 | 7/2010 | Saitoh | |
| 2016/0170175 A1* | 6/2016 | Chang | G02B 9/64 359/708 |

FOREIGN PATENT DOCUMENTS

JP  2009-063877  3/2009

* cited by examiner

*Primary Examiner* — James Jones
(74) *Attorney, Agent, or Firm* — Wenderoth, Lind & Ponack, L.L.P.

(57) ABSTRACT

A wide-angle lens system includes a first lens group, an aperture stop, and a second lens group having positive optical power. The first lens group includes, at least, a first lens element that has a meniscus shape convex on the object side, and has negative optical power, a second lens element that has a meniscus shape convex on the object side, and has negative optical power, a third lens element that is concave on the image side and has negative optical power, and a posterior lens element. The second lens element is an aspherical lens, and the second lens element satisfies a conditional expression:

$$0.3 < (R21-R22)/(R21+R22) < 0.8$$

where
R21 is a radius of paraxial curvature on the object side of the second lens element, and
R22 is a radius of paraxial curvature on the image side of the second lens element.

18 Claims, 7 Drawing Sheets

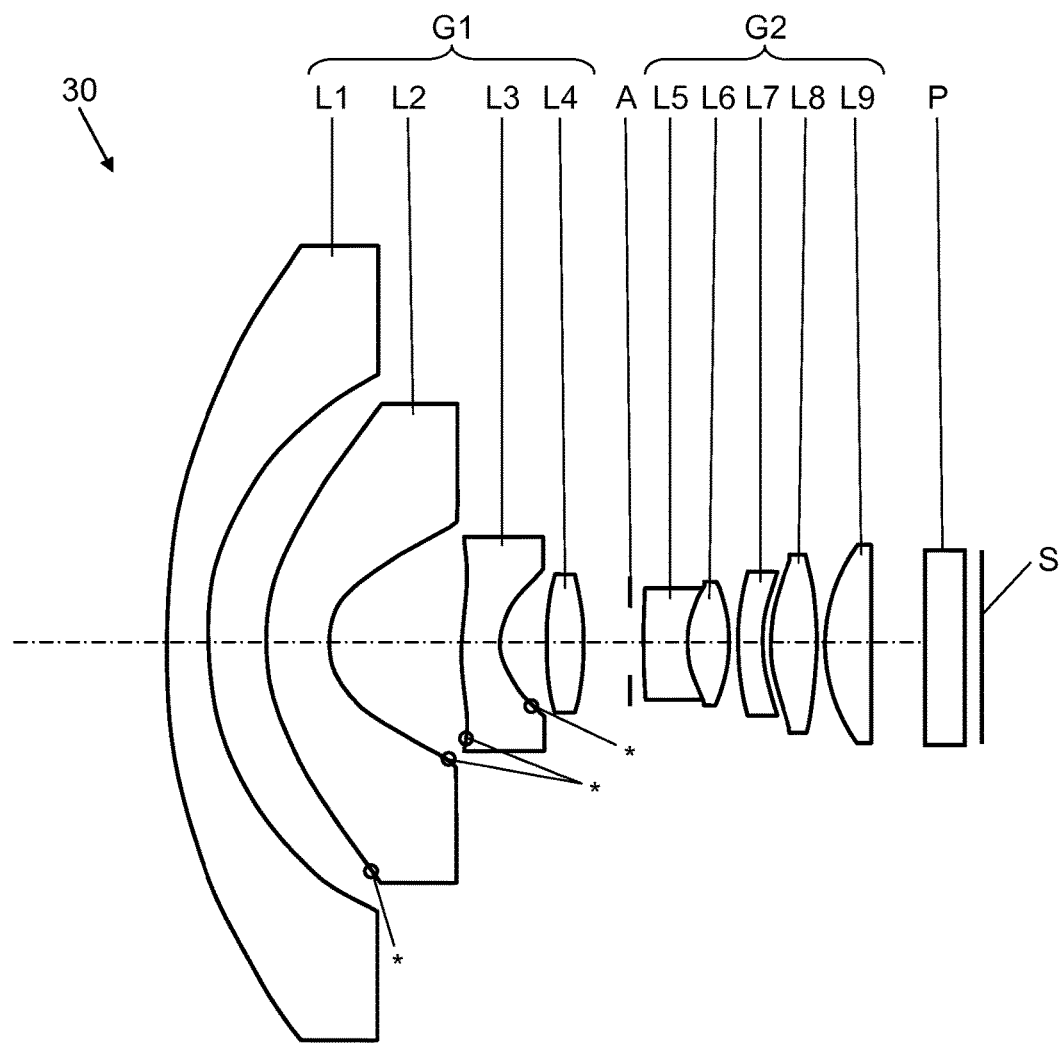

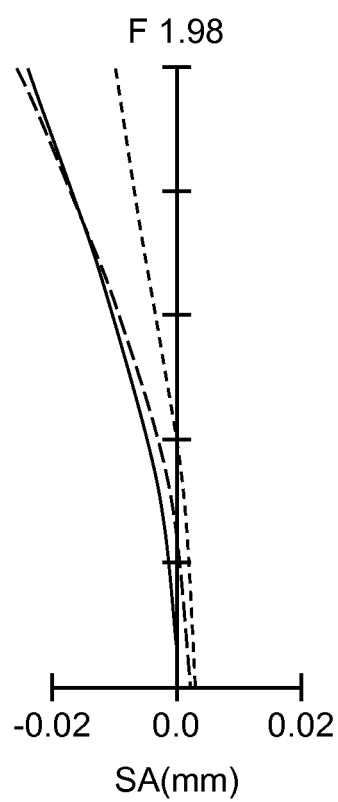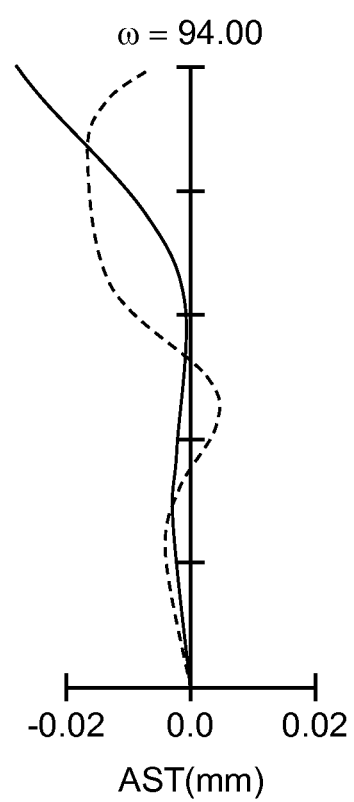

WIDE-ANGLE LENS SYSTEM AND IMAGING APPARATUS

BACKGROUND

1. Technical Field

The present disclosure relates to a wide-angle lens system for use in an imaging apparatus such as an on-vehicle camera or a surveillance camera, and to an imaging apparatus having a wide-angle lens system.

2. Description of the Related Art

PTL 1 discloses a super-wide-angle lens system having a configuration of five lens elements in four groups, including, in order from an object side to an image side, a first lens element having negative optical power, a second lens element having negative optical power, a third lens element having positive optical power, and a cemented lens having positive optical power.

CITATION LIST

Patent Literature

PTL 1: Unexamined Japanese Patent Publication No. 2009-63877

SUMMARY

An object of the present disclosure is to provide a wide-angle lens system that is small-sized, and at the same time, has a large aperture and provides high performance.

A wide-angle lens system includes, in order from an object side to an image side, a first lens group, an aperture stop, and a second lens group having positive optical power. The first lens group includes, in order from the object side to the image side, at least, a first lens element that has a meniscus shape convex on the object side, and has negative optical power, a second lens element that has a meniscus shape convex on the object side, and has negative optical power, a third lens element that is concave on the image side and has negative optical power, and a posterior lens element. The second lens element is an aspherical lens, and the second lens element satisfies a conditional expression:

$$0.3 < (R21-R22)/(R21+R22) < 0.8$$

where

R21 is a radius of paraxial curvature on the object side of the second lens element, and R22 is a radius of paraxial curvature on the image side of the second lens element.

The present disclosure can provide a wide-angle lens system that is small-sized, and at the same time, has a large aperture and provides high performance.

BRIEF DESCRIPTION OF DRAWINGS

FIG. 5 is a lens arrangement diagram of a wide-angle lens system according to a third exemplary embodiment;

FIG. 6A is a diagram illustrating a longitudinal spherical aberration of the wide-angle lens system according to the third exemplary embodiment that is focused at infinity;

FIG. 6B is a diagram illustrating a longitudinal astigmatism of the wide-angle lens system according to the third exemplary embodiment that is focused at infinity.

DETAILED DESCRIPTION OF THE PREFERRED EMBODIMENTS

Exemplary embodiments will be described below in detail with reference to the drawings as appropriate. Note that a more detailed description than is necessary may be omitted. For example, a well-known subject may not be described in detail, and/or the substantially same configuration may not be described redundantly. This is to avoid unnecessary redundancy in the following description, and to facilitate understanding by those skilled in the art.

It is understood that the inventors of the present invention provide the attached drawings and the following description so that those skilled in the art will fully understand the present disclosure, and do not intend to limit the claimed subject matter.

Figure 1:
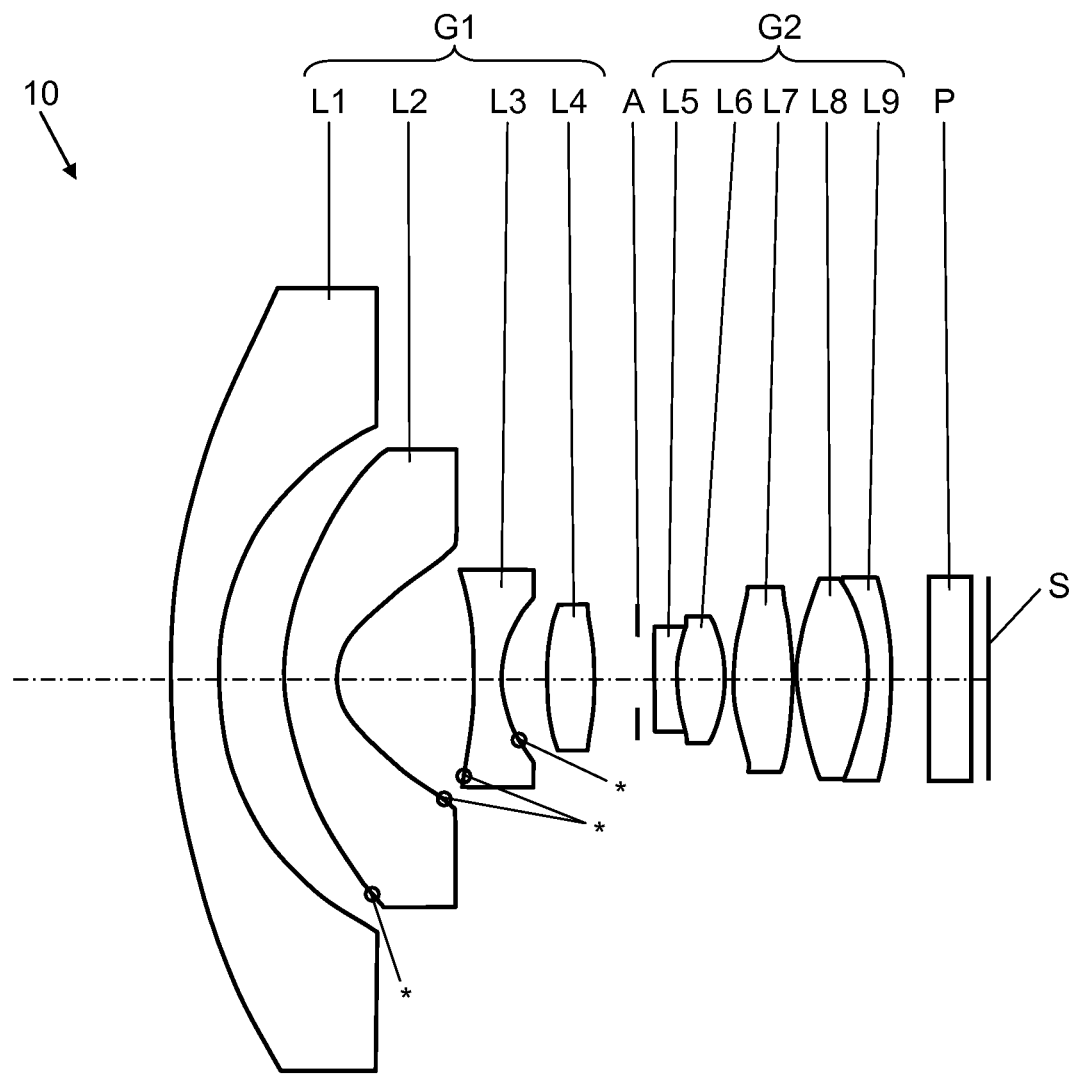
FIG. 1 is a lens arrangement diagram of a wide-angle lens system according to a first exemplary embodiment.
Figure 3:
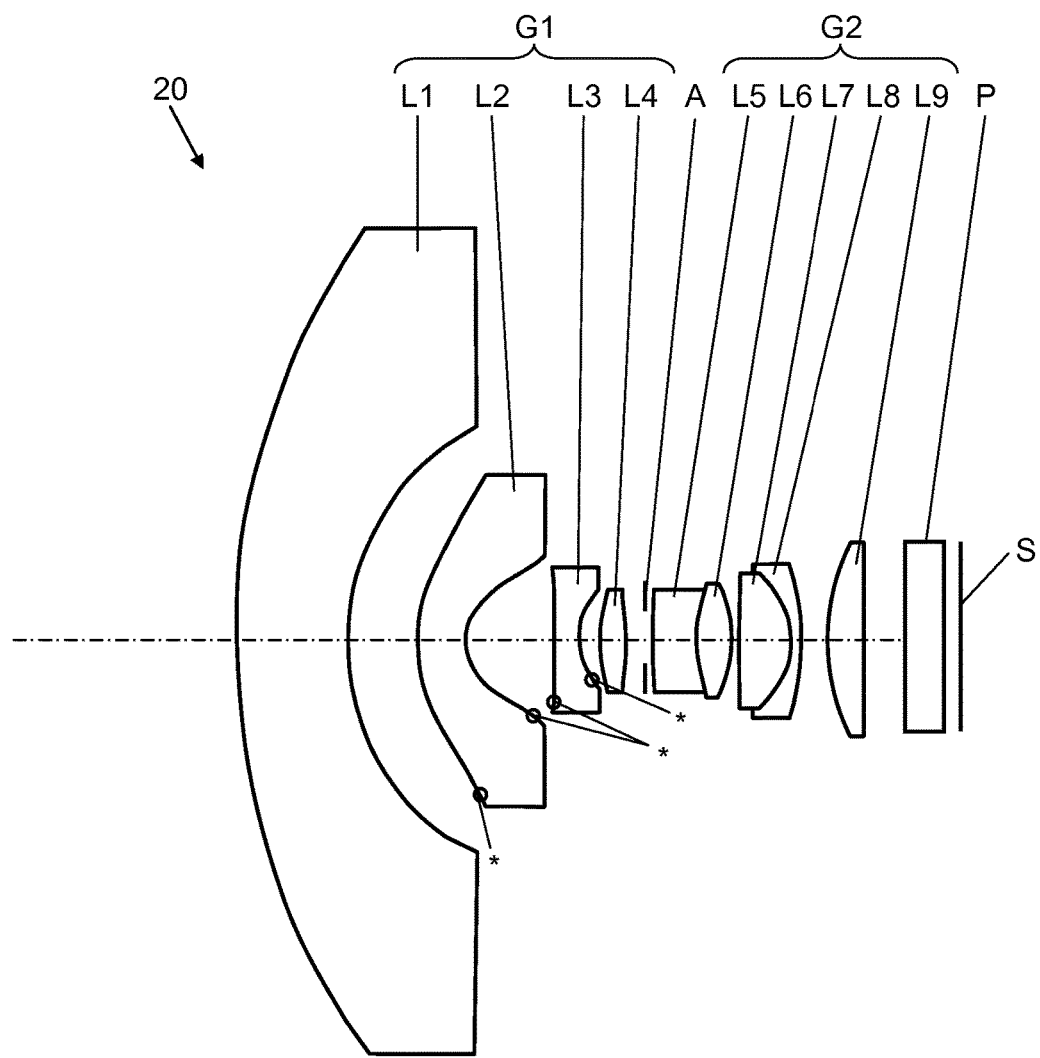
FIG. 3 is a lens arrangement diagram of a wide-angle lens system according to a second exemplary embodiment.

FIGS. 1, 3, and 5 are lens arrangement diagrams of wide-angle lens systems respectively according to first, second, and third exemplary embodiments. The lens systems are each focused at infinity. In each of these figures, a surface indicated by an asterisk (*) is aspherical. The line segment illustrated at a right end of each figure represents the position of image surface S of the imaging element.

Configuration of Wide-Angle Lens System

FIG. 1 illustrates wide-angle lens system 10 according to the first exemplary embodiment. As shown in FIG. 1, wide-angle lens system 10 includes, in order from an object side to an image side, first lens group G1 having positive optical power, aperture stop A, second lens group G2 having positive optical power, and plane-parallel plate P.

First lens group G1 includes, in order from the object side to the image side, first lens element L1 having negative optical power, second lens element L2 having negative optical power, third lens element L3 having negative optical power, and fourth lens element L4 having positive optical power.

Second lens group G2 includes, in order from the object side to the image side, fifth lens element L5 having negative optical power, sixth lens element L6 having positive optical power, seventh lens element L7 having positive optical power, eighth lens element L8 having positive optical power, and ninth lens element L9 having negative optical power. Fifth lens element L5 and sixth lens element L6 are bonded together using adhesive or the like to form a cemented lens. Eighth lens element L8 and ninth lens element L9 are bonded together using adhesive or the like to form a cemented lens.

The lens elements of first lens group G1 will next be described. First lens element L1 is a meniscus lens that is convex on the object side. Second lens element L2 is a meniscus lens that is convex on the object side, and has aspheric profiles on the object side and the image side. Third lens element L3 is a biconcave lens, and has aspheric profiles on both the object side and the image side. Fourth lens element L4 is a biconvex lens.

The lens elements of second lens group G2 will next be described. Fifth lens element L5 is a biconcave lens. Sixth lens element L6 is a biconvex lens. Seventh lens element L7 is a biconvex lens. Eighth lens element L8 is a biconvex lens. Ninth lens element L9 is a meniscus lens that is concave on the object side.

FIG. 3 illustrates wide-angle lens system 20 according to the second exemplary embodiment. As shown in FIG. 3, wide-angle lens system 20 includes, in order from the object side to the image side, first lens group G1 having positive optical power, aperture stop A, second lens group G2 having positive optical power, and plane-parallel plate P.

First lens group G1 includes, in order from the object side to the image side, first lens element L1 having negative optical power, second lens element L2 having negative optical power, third lens element L3 having negative optical power, and fourth lens element L4 having positive optical power.

Second lens group G2 includes, in order from the object side to the image side, fifth lens element L5 having negative optical power, sixth lens element L6 having positive optical power, seventh lens element L7 having positive optical power, eighth lens element L8 having negative optical power, and ninth lens element L9 having positive optical power. Fifth lens element L5 and sixth lens element L6 are bonded together using adhesive or the like to form a cemented lens. Seventh lens element L7 and eighth lens element L8 are bonded together using adhesive or the like to form a cemented lens.

The lens elements of first lens group G1 will next be described. First lens element L1 is meniscus lens that is convex on the object side. Second lens element L2 is a meniscus lens that is convex on the object side, and has aspheric profiles on both the object side and the image side. Third lens element L3 is a biconcave lens, and has aspheric profiles on both the object side and the image side. Fourth lens element L4 is a biconvex lens.

The lens elements of second lens group G2 will next be described. Fifth lens element L5 is a meniscus lens that is convex on the object side. Sixth lens element L6 is a biconvex lens. Seventh lens element L7 is a biconvex lens. Eighth lens element L8 is a meniscus lens that is convex on the image side. Ninth lens element L9 is a biconvex lens.

FIG. 5 illustrates wide-angle lens system 30 according to the third exemplary embodiment. As shown in FIG. 5, wide-angle lens system 30 includes, in order from the object side to the image side, first lens group G1 having positive optical power, aperture stop A, second lens group G2 having positive optical power, and plane-parallel plate P.

First lens group G1 includes, in order from the object side to the image side, first lens element L1 having negative optical power, second lens element L2 having negative optical power, third lens element L3 having negative optical power, and fourth lens element L4 having positive optical power.

Second lens group G2 includes, in order from the object side to the image side, fifth lens element L5 having negative optical power, sixth lens element L6 having positive optical power, seventh lens element L7 having negative optical power, eighth lens element L8 having positive optical power, and ninth lens element L9 having positive optical power. Fifth lens element L5 and sixth lens element L6 are bonded together using adhesive or the like to form a cemented lens.

The lens elements of first lens group G1 will next be described. First lens element L1 is a meniscus lens that is convex on the object side. Second lens element L2 is a meniscus lens that is convex on the object side, and has aspheric profiles on both the object side and the image side. Third lens element L3 is a meniscus lens that is convex on the object side, and has aspheric profiles on both the object side and the image side. Fourth lens element L4 is a biconvex lens.

The lens elements of second lens group G2 will next be described. Fifth lens element L5 is a meniscus lens that is convex on the object side. Sixth lens element L6 is a biconvex lens. Seventh lens element L7 is a meniscus lens that is convex on the object side. Eighth lens element L8 is a biconvex lens. Ninth lens element L9 is a meniscus lens that is convex on the object side.

Example of Application to Camera

An example of a camera to which wide-angle lens system 10 according to the first exemplary embodiment is applied will next be described. As an example of the camera, a surveillance camera will be described. Note that, instead of applying wide-angle lens system 10 according to the first exemplary embodiment, either wide-angle lens system 20 or 30 according to the second or third exemplary embodiment may be applied.

Figure 7:
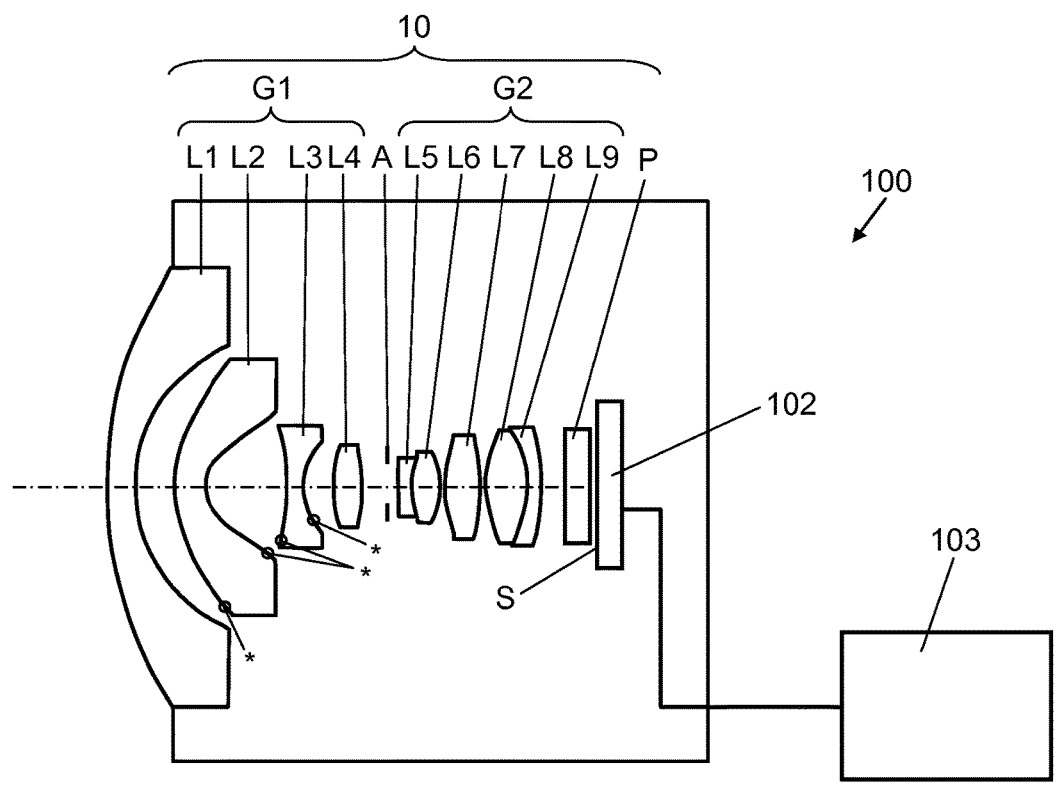
FIG. 7 is a schematic configuration diagram of a surveillance camera to which the wide-angle lens system according to the first exemplary embodiment is applied.

FIG. 7 illustrates a schematic configuration of surveillance camera 100 to which wide-angle lens system 10 according to the first exemplary embodiment is applied.

Surveillance camera 100 may be mounted in any place, and is used for capturing a wide field image. An image captured by surveillance camera 100 is displayed on a predetermined monitor or the like, for use in an operation such as real-time monitoring and/or monitoring of recorded data. Wide-angle lens system 10 of the first exemplary embodiment is more effective when used in a surveillance camera. This is because wide-angle lens system 10 of the first exemplary embodiment can capture an image with an angle of view exceeding 180 degrees, and thus a wide field image can be captured by a single surveillance camera.

Surveillance camera 100 includes wide-angle lens system 10, imaging element 102, and CPU 103. Imaging element 102 receives an optical image formed by wide-angle lens system 10, and converts the received optical image into an electrical image signal. CPU 103 obtains the image signal, and performs various processes, such as analog-to-digital conversion and YC conversion, to generate image data. The image data generated by CPU 103 is displayed on a monitor (not shown) or the like, or is recorded in a memory (not shown) or the like.

While the foregoing description has presented an example of applying wide-angle lens system 10 according to the first exemplary embodiment to surveillance camera 100, wide-angle lens system 10 is also applicable to an on-vehicle camera, to a web camera, or the like.

Conditions and Advantageous Effects

Conditions that can be satisfied by wide-angle lens systems 10, 20, and 30 according to the first, second, and third exemplary embodiments will be described below. Note that a most effective configuration of a wide-angle lens system is one that satisfies all of a plurality of possible conditions defined with respect to wide-angle lens systems 10, 20, and 30 according to the first, second, and third exemplary embodiments. However, satisfying only a part of such conditions can produce a wide-angle lens system that provides a corresponding advantage or corresponding advantages.

Each of the wide-angle lens systems described above includes, in order from the object side, first lens group G1, aperture stop A, and second lens group G2 having positive optical power. First lens group G1 includes first lens element L1 that has a meniscus shape convex on the object side, and has negative optical power, second lens element L2 that has a meniscus shape convex on the object side, and has negative optical power, third lens element L3 that is concave on the image side and has negative optical power, and a posterior lens element. Second lens element L2 has aspheric profiles on both the object side and the image side.

Third lens element L3 has aspheric profiles on both the object side and the image side. As shown in FIGS. 1 and 3, third lens element L3 may be concave on the object side. Although the posterior lens element corresponds to fourth lens elements L4 shown in FIGS. 1, 3, and 5, the posterior lens element may include a plurality of lenses.

Such configuration of first lens element L1, second lens element L2, and third lens element L3 achieves a wide-angle lens system that is small-sized, has a large aperture, and provides high performance.

In addition, a wide-angle lens system preferably satisfies the following conditional expression (1):

$$0.3 < (R21 - R22)/(R21 + R22) < 0.8 \tag{1}$$

where

R21 is a radius of paraxial curvature on the object side of second lens element L2 that has a meniscus shape, and R22 is a radius of paraxial curvature on the image side of second lens element L2 that has a meniscus shape.

The conditional expression (1) is intended to define the profile of second lens element L2. A value below a lower limit of the conditional expression (1) results in excessively low negative optical power of second lens element L2, making it difficult to achieve a wide-angle view. In contrast, a value exceeding an upper limit of the conditional expression (1) results in excessively high negative optical power of second lens element L2, making it difficult to correct aberrations, in particular, distortion and field curvature, which prevents high optical performance from being provided.

The effects described above can be enhanced by further satisfying at least one of the following conditional expressions (1A) and (1B).

$$0.45 < (R21 - R22)/(R21 + R22) \tag{1A}$$

$$(R21 - R22)/(R21 + R22) < 0.65 \tag{1B}$$

With this configuration, a wide-angle lens system that is small-sized, has a large aperture, and provides high performance can be achieved.

Evaluation of the conditional expression (1) with respect to the first to third exemplary embodiments will be described later herein.

A wide-angle lens system also preferably satisfies, for example, the following conditional expression (2):

$$2\omega \geq 180° \tag{2}$$

where 2ω is an angle of view.

The wide-angle lens systems according to the first to third exemplary embodiments satisfy the conditional expression (2) to achieve a wide-angle view while maintaining the optical properties. Evaluation of the conditional expression (2) with respect to the first to third exemplary embodiments will be described later herein.

A wide-angle lens system also preferably satisfies, for example, the following conditional expression (3):

$$0.35 < \Sigma Di/T1 < 0.70 \tag{3}$$

where

ΣDi is a sum of the center thicknesses of the lens elements included in first lens group G1, and T1 is a total thickness of first lens group G1.

The conditional expression (3) is intended to define the center thicknesses of the lens elements included in first lens group G1. A value exceeding an upper limit of the conditional expression (3) reduces the air gaps in first lens group G1, and thus increases the optical power of first lens group G1, making it difficult to correct aberrations. In contrast, a value below a lower limit of the conditional expression (3) increases the air gaps in first lens group G1, and thus reduces the optical power of first lens group G1, making it difficult to reduce the size of a wide-angle lens system.

The effects described above can be enhanced by further satisfying at least one of the following conditional expressions (3A) and (3B).

$$0.40 < \Sigma Di/T1 \tag{3A}$$

$$\Sigma Di/T1 < 0.60 \tag{3B}$$

With this configuration, a small-sized and high performance wide-angle lens system can be achieved.

By satisfying the conditional expression (3), the wide-angle lens systems according to the first to third exemplary embodiments achieve both small size and wide-angle view. Evaluation of the conditional expression (3) with respect to the first to third exemplary embodiments will be described later herein.

A wide-angle lens system also preferably satisfies, for example, the following conditional expression (4):

$$0.5 < |fG1/fG2| < 4.0 \tag{4}$$

where fG1 is a focal length of first lens group G1, and fG2 is a focal length of second lens group G2.

The conditional expression (4) is intended to define the focal lengths of first lens group G1 and of second lens group G2. A value below a lower limit of the conditional expression (4) results in excessively high optical power of first lens group G1, making it difficult to correct aberrations, which prevents high optical performance from being provided. In contrast, a value exceeding an upper limit of the conditional expression (4) results in excessively low optical power of first lens group G1, making it difficult to reduce the size of a wide-angle lens system.

The effects described above can be enhanced by further satisfying at least one of the following conditional expressions (4A) and (4B).

$$0.6 < |fG1/fG2| \tag{4A}$$

$$|fG1/fG2| < 3.5 \tag{4B}$$

With this configuration, a small-sized and high performance wide-angle lens system can be achieved.

By satisfying the conditional expression (4), the wide-angle lens systems according to the first to third exemplary embodiments achieve both small size and high performance. Evaluation of the conditional expression (4) with respect to the first to third exemplary embodiments will be described later herein.

In addition, a wide-angle lens system is preferably configured such that second lens group G2 includes at least one cemented lens, and second lens group G2 is formed of at least four lens elements.

With this configuration, aberrations are satisfactorily corrected, and thus a small-sized and high performance wide-angle lens system can be achieved.

A wide-angle lens system also preferably satisfies, for example, the following conditional expression (5):

$$0.62 \leq PgF + 0.0018 \times vd \leq 0.72 \quad (5)$$

where

PgF is a partial dispersion ratio, and vd is an Abbe number.

The conditional expression (5) is intended to define partial dispersion ratios and Abbe numbers of at least two of the lens elements having negative optical power included in first lens group G1, and of at least two of the lens elements having positive optical power included in second lens group G2. A value beyond limits of the conditional expression (5) makes it difficult to correct chromatic aberration, which prevents high optical performance from being provided.

The effects described above can be enhanced by further satisfying at least one of the following conditional expressions (5A) and (5B).

$$0.64 \leq PgF + 0.0018 \times vd \quad (5A)$$

$$PgF + 0.0018 \times vd \leq 0.70 \quad (5B)$$

With this configuration, chromatic aberration is satisfactorily corrected up to a near infrared wavelength region, and thus a small-sized and high performance wide-angle lens system can be achieved.

By satisfying the conditional expression (5), the first to third exemplary embodiments each achieve a small-sized and high performance wide-angle lens system that can satisfactorily correct chromatic aberration up to a near infrared wavelength region. Evaluation of the conditional expression (5) with respect to the first to third exemplary embodiments will be described later herein.

A wide-angle lens system also preferably satisfies, for example, the following conditional expression (6):

$$3.0 \leq |Th/h| \quad (6)$$

where

Th is an exit pupil position (distance from image surface), and h is an image height.

The conditional expression (6) is intended to define an exit pupil position and an image height in a wide-angle lens system. A value below a limit of the conditional expression (6) prevents the ray incident angle incident on the imaging element from being suitably set, making it difficult to achieve a small-sized and high performance wide-angle lens system.

The effects described above can be enhanced by further satisfying the following conditional expression (6A).

$$4.0 \leq |Th/h| \quad (6A)$$

With this configuration, the ray incident angle incident on the imaging element is suitably set, and thus a small-sized and high performance wide-angle lens system can be achieved.

By satisfying the conditional expression (6), the first to third exemplary embodiments each achieve a wide-angle lens system having a suitably-set ray incident angle incident on the imaging element. Evaluation of the conditional expression (6) with respect to the first to third exemplary embodiments will be described later herein.

In addition, a wide-angle lens system is preferably configured such that first lens group G1 includes at least two aspherical lenses, and that the aspherical lenses of first lens group G1 satisfy, for example, the following conditional expressions (7) and (8):

$$1.50 < n_{asp} < 1.65 \quad (7)$$

$$20 < v_{asp} < 60 \quad (8)$$

where $n_{asp}$ is a refractive index to the d-line of an aspherical lens, and $v_{asp}$ is an Abbe number to the d-line of an aspherical lens.

With this configuration, aspherical lenses can be formed of a resin material, and thus weight reduction and cost reduction of a wide-angle lens system can be achieved.

By satisfying the conditional expressions (7) and (8), Examples 1 to 3 described below achieve weight reduction and cost reduction of the wide-angle lens systems. Evaluation of the conditional expressions (7) and (8) with respect to Examples 1 to 3 will be described later herein.

A wide-angle lens system also preferably satisfies, for example, the following conditional expression (9):

$$1.81 < n1 < 1.95 \quad (9)$$

where n1 is a refractive index to the d-line of the outermost lens on the object side.

The conditional expression (9) is intended to define the refractive index of first lens element L1, which is the outermost lens on the object side. A value below a lower limit of the conditional expression (9) results in excessively low optical power of first lens element L1, making it difficult to correct aberrations, in particular, field curvature. In contrast, a value exceeding an upper limit of the conditional expression (9) results in excessively high optical power of first lens element L1, making it difficult to correct aberrations, in particular, field curvature.

The effects described above can be enhanced by further satisfying the following conditional expressions (9A) and (9B).

$$1.83 < n1 \quad (9A)$$

$$n1 < 1.93 \quad (9B)$$

With this configuration, a wide-angle lens system having an appropriately corrected field curvature can be achieved.

By satisfying the conditional expression (9), Examples 1 to 3 each achieve a wide-angle lens system having an appropriately corrected field curvature. Evaluation of the conditional expression (9) with respect to Examples 1 to 3 will be described later herein.

EXAMPLES

Examples 1 to 3 of the wide-angle lens systems according to the first to third exemplary embodiments will be described below. Note that, in Examples 1 to 3, the lengths listed in the tables are all in millimeters (mm), and the angles of view listed therein are all in degrees (°). In addition, in Examples 1 to 3, "r" denotes the radius of curvature, "d" denotes the spacing, "nd" denotes the refractive index to the d-line, and "vd" denotes the Abbe number to the d-line. Further, in Examples 1 to 3, a surface indicated by an asterisk (*) is aspherical. An aspheric profile is defined by the following equation:

$$Z = \frac{h^2/r}{1+\sqrt{1-(1+\kappa)(h/r)^2}} + \sum A_n h^n \quad \text{[Equation 1]}$$

where Z is a distance from a point on that aspheric profile at a height h from the optical axis, to the tangential plane at an aspherical apex; h is the height from the optical axis; r is the radius of curvature at the aspherical apex, κ is the conic constant, and An is the nth-order aspherical coefficient.

FIGS. 2A, 2B, 4A, 4B, 6A, and 6B are diagrams illustrating longitudinal aberrations of the wide-angle lens systems according to Examples 1 to 3 that are focused at infinity. Of these diagrams of longitudinal aberrations, FIGS. 2A, 4A, and 6A each illustrate the spherical aberration (SA (mm)), and FIGS. 2B, 4B, and 6B each illustrate the astigmatism (AST (mm)).

Figure 2A:
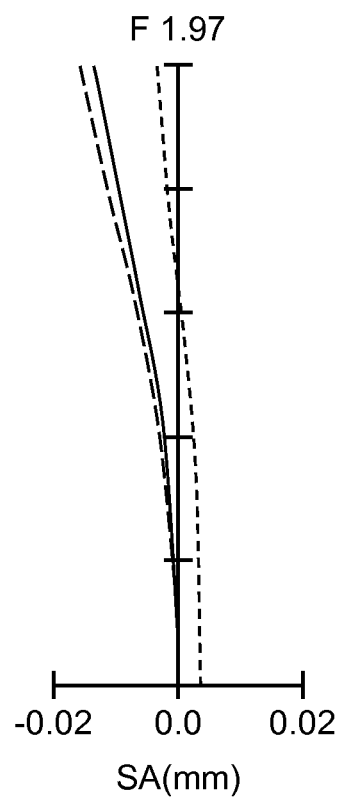
FIG. 2A is a diagram illustrating a longitudinal spherical aberration of the wide-angle lens system according to the first exemplary embodiment that is focused at infinity.
Figure 4A:
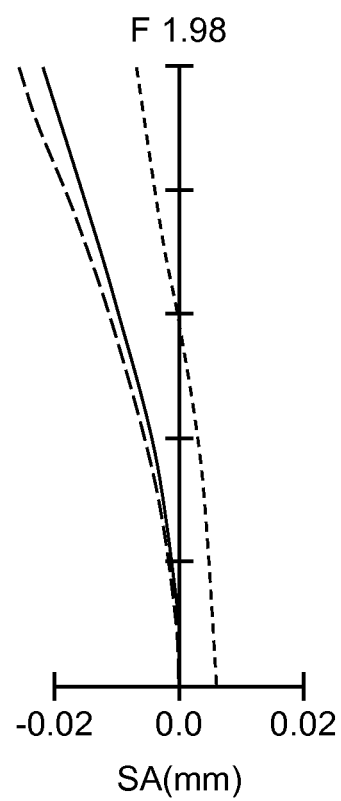
FIG. 4A is a diagram illustrating a longitudinal spherical aberration of the wide-angle lens system according to the second exemplary embodiment that is focused at infinity.

In each of the spherical aberration diagrams shown in FIGS. 2A, 4A, and 6A, the vertical axis represents the f-number (indicated by F in the drawing); the solid line represents a characteristic to the d-line; the short broken line represents a characteristic for the F-line; and the long broken line represents a characteristic for the C-line.

Figure 2B:
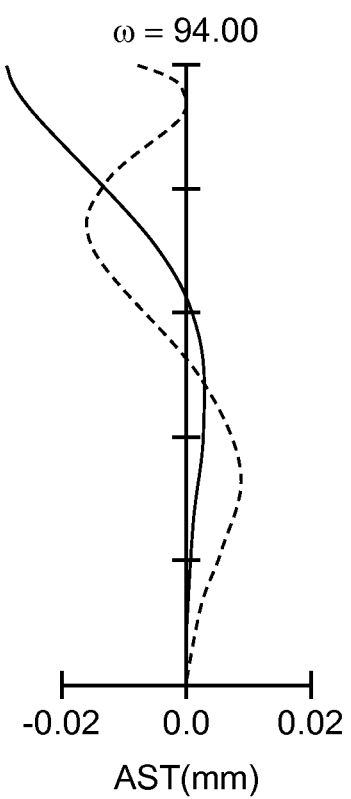
FIG. 2B is a diagram illustrating a longitudinal astigmatism of the wide-angle lens system according to the first exemplary embodiment that is focused at infinity.
Figure 4B:
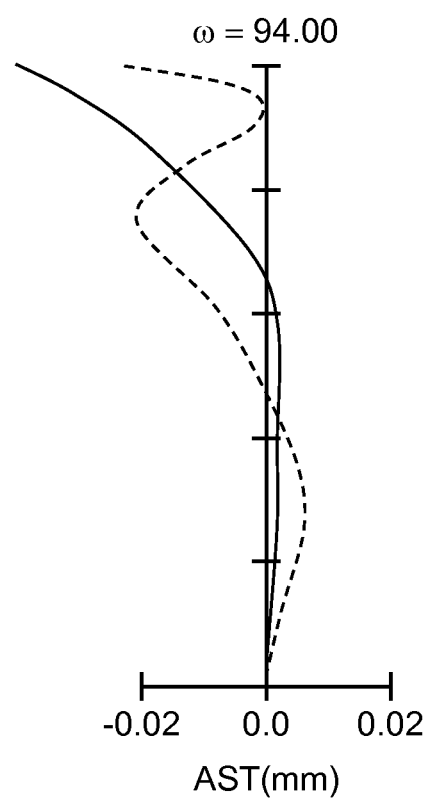
FIG. 4B is a diagram illustrating a longitudinal astigmatism of the wide-angle lens system according to the second exemplary embodiment that is focused at infinity.

In each of the astigmatism diagrams shown in FIGS. 2B, 4B, and 6B, the vertical axis represents the image height; the solid line represents a characteristic for the sagittal plane (indicated by s in the drawing); and the broken line represents a characteristic for the meridional plane (indicated by m in the drawing). Note that ω denotes the half angle of view.

Example 1

Example 1 corresponds to wide-angle lens system 10, shown in FIG. 1, according to the first exemplary embodiment. Table 1, Table 2, and Table 3 respectively show surface data, aspherical data, and various data in focus at infinity, of wide-angle lens system 10.

TABLE 1

Surface Data

| | Surface number | r | d | nd | vd |
|---|---|---|---|---|---|
| | Object surface | ∞ | | | |
| L1 | 1 | 23.69310 | 1.50010 | 1.91082 | 35.2 |
| | 2 | 8.80540 | 2.11480 | | |
| L2 | 3* | 7.68560 | 1.66660 | 1.54360 | 56.0 |
| | 4* | 2.09700 | 4.32600 | | |
| L3 | 5* | −12.97350 | 0.89940 | 1.54360 | 56.0 |
| | 6* | 5.59510 | 1.45550 | | |
| L4 | 7 | 7.83140 | 1.49790 | 1.94595 | 18.0 |
| | 8 | −12.62150 | 1.35470 | | |
| Aperture | 9 | ∞ | 0.50000 | | |
| L5 | 10 | −42.13310 | 0.70000 | 1.94595 | 18.0 |
| | 11 | 4.40450 | | | |
| Adhesive | | | 0.01000 | 1.56732 | 42.8 |
| L6 | 12 | 4.40450 | 1.60190 | 1.49700 | 81.6 |
| | 13 | −4.15600 | 0.19970 | | |
| L7 | 14 | 7.46040 | 1.91260 | 1.49700 | 81.6 |
| | 15 | −13.07260 | 0.20000 | | |
| L8 | 16 | 8.24370 | 2.17660 | 1.59282 | 68.6 |
| | 17 | −6.40250 | | | |
| Adhesive | | | 0.01000 | 1.56732 | 42.8 |
| L9 | 18 | −6.40250 | 0.69940 | 1.84666 | 23.8 |
| | 19 | −14.17790 | 1.30000 | | |
| P | 20 | ∞ | 1.25000 | 1.51680 | 64.2 |
| | 21 | ∞ | BF | | |
| | Image surface | ∞ | | | |

TABLE 2

Aspherical Data

| Surface No. 3 | Surface No. 4 |
|---|---|
| κ = 0.00000E+00 | κ = −1.01719E+00 |
| A4 = −1.68213E−04 | A4 = 3.06381E−03 |
| A6 = −2.80339E−05 | A6 = −9.87125E−05 |
| A8 = 6.57944E−07 | A8 = −1.18547E−05 |
| A10 = −5.79998E−09 | A10 = 1.78098E−07 |
| A12 = 0.00000E+00 | A12 = 0.00000E+00 |

| Surface No. 5 | Surface No. 6 |
|---|---|
| κ = 4.17038E+00 | κ = 8.25318E−01 |
| A4 = 2.94363E−03 | A4 = 8.96634E−03 |
| A6 = −5.86959E−04 | A6 = −1.04599E−03 |
| A8 = 5.39093E−05 | A8 = 2.18732E−04 |
| A10 = −2.26012E−06 | A10 = −1.30137E−05 |
| A12 = 3.46248E−08 | A12 = 0.00000E+00 |

TABLE 3

Various Data

| Focal length | 1.3839 |
|---|---|
| Focal length of the first lens group (fG1) | 15.89297 |
| Focal length of the second lens group (fG2) | 4.776259 |
| F-number | 1.97092 |
| Half view angel (ω) | 94.0000 |
| Image height (h) | 2.8198 |
| Overall length of lens system | 26.0034 |
| BF | 0.64816 |
| Entrance pupil position | 5.9588 |
| Exit pupil position (Th) | −17.2031 |

Example 2

Example 2 corresponds to wide-angle lens system 20, shown in FIG. 3, according to the second exemplary embodiment. Table 4, Table 5, and Table 6 respectively show surface data, aspherical data, and various data in focus at infinity, of wide-angle lens system 20.

TABLE 4

Surface Data

| | Surface number | r | d | nd | vd |
|---|---|---|---|---|---|
| | Object surface | ∞ | | | |
| L1 | 1 | 26.04560 | 4.50000 | 1.91082 | 35.2 |
| | 2 | 8.91830 | 2.87560 | | |
| L2 | 3* | 7.62740 | 1.83080 | 1.54410 | 56.1 |
| | 4* | 1.98690 | 3.57040 | | |
| L3 | 5* | −117.01350 | 1.00000 | 1.54410 | 56.1 |
| | 6* | 2.59170 | 0.88230 | | |
| L4 | 7 | 6.24690 | 1.00000 | 1.94595 | 18.0 |
| | 8 | −13.25250 | 0.84500 | | |
| Aperture | 9 | ∞ | 0.20000 | | |
| L5 | 10 | 45.87170 | 1.87010 | 1.94595 | 18.0 |
| | 11 | 4.85320 | | | |
| Adhesive | | | 0.01000 | 1.56732 | 42.8 |
| L6 | 12 | 4.85320 | 1.38780 | 1.59282 | 68.6 |
| | 13 | −3.97850 | 0.15000 | | |
| L7 | 14 | 17.28960 | 2.13240 | 1.59282 | 68.6 |
| | 15 | −3.20780 | | | |
| Adhesive | | | 0.01000 | 1.56732 | 42.8 |
| L8 | 16 | −3.20780 | 0.50000 | 1.94595 | 18.0 |
| | 17 | −7.06320 | 0.95450 | | |
| L9 | 18 | 7.33470 | 1.57100 | 1.90366 | 31.3 |
| | 19 | −55.95570 | 1.90000 | | |

TABLE 4-continued

Surface Data

| Surface number | | r | d | nd | vd |
|---|---|---|---|---|---|
| P | 20 | ∞ | 0.80000 | 1.51680 | 64.2 |
| | 21 | ∞ | BF | | |
| Image surface | | ∞ | | | |

TABLE 5

Aspherical Data

| Surface No. 3 | Surface No. 4 |
|---|---|
| κ = −9.15679E−01 | κ = −8.46438E−01 |
| A4 = 2.03434E−03 | A4 = 1.09105E−02 |
| A6 = −9.27020E−05 | A6 = 8.04726E−05 |
| A8 = 1.00644E−06 | A8 = 6.44500E−05 |
| A10 = 5.75083E−09 | A10 = −9.28638E−06 |
| A12 = −1.08875E−10 | A12 = −4.74598E−07 |

| Surface No. 5 | Surface No. 6 |
|---|---|
| κ = −1.00000E+01 | κ = −4.21745E−01 |
| A4 = 2.33291E−04 | A4 = 1.78113E−03 |
| A6 = −3.57328E−04 | A6 = −3.93847E−04 |
| A8 = 1.35786E−05 | A8 = 2.85290E−05 |
| A10 = 3.93802E−07 | A10 = 2.83603E−09 |
| A12 = −8.66618E−08 | A12 = 0.00000E+00 |

TABLE 6

Various Data

| | |
|---|---|
| Focal length | 1.3148 |
| Focal length of the first lens group (fG1) | −10.5224 |
| Focal length of the second lens group (fG2) | 4.091615 |
| F-number | 1.97639 |
| Half view angel (ω) | 94.0000 |
| Image height (h) | 2.6794 |
| Overall length of lens system | 28.0000 |
| BF | 0.01005 |
| Entrance pupil position | 8.5503 |
| Exit pupil position (Th) | −161.6056 |

Example 3

Example 3 corresponds to wide-angle lens system 30, shown in FIG. 5, according to the third exemplary embodiment. Table 7, Table 8, and Table 9 respectively show surface data, aspherical data, and various data in focus at infinity, of wide-angle lens system 30.

TABLE 7

Surface Data

| | Surface number | r | d | nd | vd |
|---|---|---|---|---|---|
| | Object surface | ∞ | | | |
| L1 | 1 | 21.81190 | 1.40000 | 1.91082 | 35.2 |
| | 2 | 9.94920 | 2.01600 | | |
| L2 | 3* | 8.59110 | 2.06660 | 1.54410 | 56.1 |
| | 4* | 2.44450 | 4.42610 | | |
| L3 | 5* | 5.70200 | 1.30000 | 1.54410 | 56.1 |
| | 6* | 1.80050 | 1.63510 | | |
| L4 | 7 | 14.35550 | 1.19670 | 1.94595 | 18.0 |
| | 8 | −9.67060 | 1.55300 | | |

TABLE 7-continued

Surface Data

| | Surface number | r | d | nd | vd |
|---|---|---|---|---|---|
| Aperture | 9 | ∞ | 0.45900 | | |
| L5 | 10 | 21.15740 | 1.50000 | 1.94595 | 18.0 |
| | 11 | 4.00090 | | | |
| Adhesive | | | 0.01000 | 1.56732 | 42.8 |
| L6 | 12 | 4.00090 | 1.33180 | 1.71300 | 53.9 |
| | 13 | −5.58160 | 0.35260 | | |
| L7 | 14 | 9.90630 | 0.80000 | 1.94595 | 18.0 |
| | 15 | 5.60860 | 0.29820 | | |
| L8 | 16 | 6.48760 | 1.54400 | 1.59282 | 68.6 |
| | 17 | −12.93740 | 0.30990 | | |
| L9 | 18 | 5.97890 | 1.50420 | 1.59282 | 68.6 |
| | 19 | 127.96720 | 1.94700 | | |
| P | 20 | ∞ | 0.80000 | 1.51680 | 64.2 |
| | 21 | ∞ | BF | | |
| Image surface | | ∞ | | | |

TABLE 8

Aspherical Data

| Surface No. 3 | Surface No. 4 |
|---|---|
| κ = −1.13272E+00 | κ = −8.23620E−01 |
| A4 = 1.28145E−03 | A4 = 3.81367E−03 |
| A6 = −4.94678E−05 | A6 = 1.82307E−04 |
| A8 = 6.60284E−07 | A8 = 1.31899E−08 |
| A10 = −2.97937E−09 | A10 = −1.24802E−06 |
| A12 = 0.00000E+00 | A12 = 0.00000E+00 |

| Surface No. 5 | Surface No. 6 |
|---|---|
| κ = −1.00000E+01 | κ = −1.07822E+00 |
| A4 = −5.03432E−03 | A4 = −8.25110E−03 |
| A6 = −5.61504E−06 | A6 = 2.82644E−04 |
| A8 = 8.77802E−06 | A8 = 1.12986E−04 |
| A10 = 1.89102E−07 | A10 = −6.32666E−06 |
| A12 = −2.18462E−08 | A12 = 0.00000E+00 |

TABLE 9

Various Data

| | |
|---|---|
| Focal length | 1.3077 |
| Focal length of the first lens group (fG1) | −9.4872 |
| Focal length of the second lens group (fG2) | 4.352975 |
| F-number | 1.97708 |
| Half view angel (ω) | 94.0000 |
| Image height (h) | 2.6791 |
| Overall length of lens system | 26.4602 |
| BF | 0.01000 |
| Entrance pupil position | 6.7826 |
| Exit pupil position (Th) | −20.1650 |

Table 10 below shows the values for the wide-angle lens systems of Examples 1 to 3 corresponding to the conditional expressions (1) to (4) and (6) to (9).

TABLE 10

| Conditional expression | | Example 1 | Example 2 | Example 3 |
|---|---|---|---|---|
| (1) (R21 − R22)/(R21 + R22) | | 0.571279619 | 0.586678177 | 0.556979231 |
| (2) 2ω | | 188 | 188 | 188 |
| (3) ΣDi/T1 | | 0.413 | 0.532 | 0.425 |
| (4) |fG1/fG2| | | 3.33 | 2.57 | 2.18 |
| (6) |Th/h| | | 6.100822753 | 60.31410017 | 7.526781382 |
| (7) $n_{asp}$ | L2 | 1.5436 | 1.5441 | 1.5441 |
| | L3 | 1.5436 | 1.5441 | 1.5441 |

TABLE 10-continued

| Conditional expression | | Example 1 | Example 2 | Example 3 |
|---|---|---|---|---|
| (8) $v_{asp}$ | L2 | 56 | 56.1 | 56.1 |
| | L3 | 56 | 56.1 | 56.1 |
| (9) n1 | | 1.91082 | 1.91082 | 1.91082 |

As shown in Table 10, wide-angle lens systems 10, 20, and 30 according to the first, second, and third exemplary embodiments satisfy the conditional expressions (1) to (4) and (6) to (9).

Table 11 below shows the values of partial dispersion ratio of the wide-angle lens systems of Examples 1 to 3. Table 12 below shows the values for the wide-angle lens systems of Examples 1 to 3 corresponding to the conditional expression (5).

TABLE 11

Partial Dispersion Ratio PgF

| Example 1 | | Example 2 | | Example 3 | |
|---|---|---|---|---|---|
| Lens element | PgF | Lens element | PgF | Lens element | PgF |
| L1 | 0.58 | L1 | 0.58 | L1 | 0.58 |
| L2 | 0.57 | L2 | 0.57 | L2 | 0.57 |
| L3 | 0.57 | L3 | 0.57 | L3 | 0.57 |
| L6 | 0.54 | L6 | 0.54 | L6 | 0.54 |
| L7 | 0.54 | L7 | 0.54 | L8 | 0.65 |
| L8 | 0.54 | L9 | 0.59 | L9 | 0.54 |

TABLE 12

PgF + 0.0018 × vd

| Example 1 | | Example 2 | | Example 3 | |
|---|---|---|---|---|---|
| L1 | 0.65 | L1 | 0.65 | L1 | 0.65 |
| L2 | 0.67 | L2 | 0.67 | L2 | 0.67 |
| L3 | 0.67 | L3 | 0.67 | L3 | 0.67 |
| L6 | 0.69 | L6 | 0.67 | L6 | 0.64 |
| L7 | 0.69 | L7 | 0.67 | L8 | 0.67 |
| L8 | 0.67 | L9 | 0.65 | L9 | 0.67 |

As shown in Table 12, wide-angle lens systems 10, 20, and 30 according to the first, second, and third exemplary embodiments satisfy the conditional expression (5).

Example of Developments of Exemplary Embodiments

The first to third exemplary embodiments have been presented as typical examples of the technique disclosed in the present application. However, the technique in the present disclosure is not limited thereto, and various modifications, substitutions, addition, and omission can be made as appropriate to the exemplary embodiments.

A wide-angle lens system according to the present disclosure is applicable to on-vehicle cameras, surveillance cameras, web cameras, and the like, and is preferably used, in particular, in a camera that requires a wide-angle lens, such as an on-vehicle camera, or a surveillance camera.

What is claimed is:

1. A wide-angle lens system comprising, in order from an object side to an image side:
a first lens group;
an aperture stop; and
a second lens group having positive optical power,
wherein the first lens group includes
in order from the object side to the image side, at least,
a first lens element that has a meniscus shape convex on the object side, and has negative optical power,
a second lens element that has a meniscus shape convex on the object side, and has negative optical power,
a third lens element that is concave on the image side and has negative optical power, and
a posterior lens element,
the second lens element is an aspherical lens,
the second lens element satisfies a conditional expression (1):

$$0.45 < (R21-R22)/(R21+R22) < 0.65 \quad (1)$$

where
R21 is a radius of paraxial curvature on the object side of the second lens element, and
R22 is a radius of paraxial curvature on the image side of the second lens element, and
the wide-angle lens system satisfies a conditional expression (6):

$$3.0 \le |Th/h| \quad (6)$$

where
Th is an exit pupil position (a distance from an image surface), and
h is an image height.

2. The wide-angle lens system according to claim 1, wherein
the third lens element is concave on the object side.

3. The wide-angle lens system according to claim 1, wherein
the wide-angle lens system satisfies a conditional expression (2):

$$2\omega \ge 180° \quad (2)$$

where 2ω is an angle of view.

4. The wide-angle lens system according to claim 1, wherein
a thickness of the first lens group and a sum of center thicknesses of lens elements included in the first lens group satisfy a conditional expression (3):

$$0.35 < \Sigma Di/T1 < 0.70 \quad (3)$$

where
ΣDi is the sum of center thicknesses of the lens elements included in the first lens group, and
T1 is a total thickness of the first lens group.

5. The wide-angle lens system according to claim 1, wherein
the first lens group and the second lens group satisfy a conditional expression (4):

$$0.5 < |fG1/fG2| < 4.0 \quad (4)$$

where
fG1 is a focal length of the first lens group, and
fG2 is a focal length of the second lens group.

6. The wide-angle lens system according to claim 1, wherein
the second lens group includes at least one cemented lens, and is formed of at least four lens elements.

7. The wide-angle lens system according to claim 1, wherein
at least two of the lens elements having negative optical power included in the first lens group, and at least two of lens elements having positive optical power included in the second lens group satisfy a conditional expression (5):

$$0.62 \le PgF + 0.0018 \times vd \le 0.72 \quad (5)$$

where
PgF is a partial dispersion ratio, and
νd is an Abbe number.

8. The wide-angle lens system according to claim 1, wherein
the first lens group includes at least two aspherical lenses, and
the at least two aspherical lenses of the first lens group satisfy conditional expressions (7) and (8):

$$1.50 < n_{asp} < 1.65 \tag{7}$$

$$20 < \nu_{asp} < 60 \tag{8}$$

where
$n_{asp}$ is a refractive index to a d-line of an aspherical lens, and
$\nu_{asp}$ is an Abbe number to the d-line of an aspherical lens.

9. The wide-angle lens system according to claim 1, wherein
the first lens element of the first lens group satisfies a conditional expression (9):

$$1.81 < n1 < 1.95 \tag{9}$$

where n1 is a refractive index to a d-line of the first lens element.

10. An imaging apparatus comprising:
the wide-angle lens system according to claim 1; and
an imaging element configured to receive an image formed by the wide-angle lens system.

11. The wide-angle lens system according to claim 2, wherein
the wide-angle lens system satisfies a conditional expression (2):

$$2\omega \geq 180° \tag{2}$$

where 2ω is an angle of view.

12. The wide-angle lens system according to claim 2, wherein
a thickness of the first lens group and a sum of center thicknesses of lens elements included in the first lens group satisfy a conditional expression (3):

$$0.35 < \Sigma Di/T1 < 0.70 \tag{3}$$

where
ΣDi is the sum of center thicknesses of the lens elements included in the first lens group, and
T1 is a total thickness of the first lens group.

13. The wide-angle lens system according to claim 2, wherein
the first lens group and the second lens group satisfy a conditional expression (4):

$$0.5 < |fG1/fG2| < 4.0 \tag{4}$$

where
fG1 is a focal length of the first lens group, and
fG2 is a focal length of the second lens group.

14. The wide-angle lens system according to claim 2, wherein
the second lens group includes at least one cemented lens, and is formed of at least four lens elements.

15. The wide-angle lens system according to claim 2, wherein
at least two of the lens elements having negative optical power included in the first lens group, and at least two of lens elements having positive optical power included in the second lens group satisfy a conditional expression (5):

$$0.62 \leq PgF + 0.0018 \times \nu d \leq 0.72 \tag{5}$$

where
PgF is a partial dispersion ratio, and
νd is an Abbe number.

16. The wide-angle lens system according to claim 2, wherein
the first lens group includes at least two aspherical lenses, and
the at least two aspherical lenses of the first lens group satisfy conditional expressions (7) and (8):

$$1.50 < n_{asp} < 1.65 \tag{7}$$

$$20 < \nu_{asp} < 60 \tag{8}$$

where
$n_{asp}$ is a refractive index to a d-line of an aspherical lens, and
$\nu_{asp}$ is an Abbe number to the d-line of an aspherical lens.

17. The wide-angle lens system according to claim 2, wherein
the first lens element of the first lens group satisfies a conditional expression (9):

$$1.81 < n1 < 1.95 \tag{9}$$

where n1 is a refractive index to a d-line of the first lens element.

18. An imaging apparatus comprising:
the wide-angle lens system according to claim 2; and
an imaging element configured to receive an image formed by the wide-angle lens system.

* * * * *